United States Patent
Acketts

(10) Patent No.: US 7,252,276 B2
(45) Date of Patent: Aug. 7, 2007

(54) PLINTH FOR AUTOMATED TELLER MACHINE

(75) Inventor: Ronald Lionel Acketts, Hockley (GB)

(73) Assignee: Acketts Group Limited, Billericay, Essex (GB)

( * ) Notice: Subject to any disclaimer, the term of this patent is extended or adjusted under 35 U.S.C. 154(b) by 262 days.

(21) Appl. No.: 10/493,565

(22) PCT Filed: Apr. 10, 2003

(86) PCT No.: PCT/GB03/01528

§ 371 (c)(1),
(2), (4) Date: Oct. 29, 2004

(87) PCT Pub. No.: WO03/103451

PCT Pub. Date: Dec. 18, 2003

(65) Prior Publication Data

US 2005/0121593 A1    Jun. 9, 2005

(30) Foreign Application Priority Data

Jun. 5, 2002 (GB) ............... 0212890.8
Oct. 16, 2002 (GB) ............... 0224126.3

(51) Int. Cl.
*A47B 91/00* (2006.01)
(52) U.S. Cl. ............... 248/346.02; 248/188.8; 248/248; 248/558

(58) Field of Classification Search ........... 248/346.01, 248/346.02, 188.8, 188.2, 188.4, 188.5, 558
See application file for complete search history.

(56) References Cited

U.S. PATENT DOCUMENTS

| 3,697,147 | A | * | 10/1972 | Schulte | 312/111 |
| 4,549,765 | A | * | 10/1985 | Hoch | 297/311 |
| 2003/0216187 | A1 | * | 11/2003 | Doll | 464/176 |

FOREIGN PATENT DOCUMENTS

| FR | 2532350 A1 | 3/1984 |
| GB | 1 462 186 A | 1/1977 |
| GB | 2 199 599 A | 7/1988 |
| GB | 2 268 541 A | 12/1994 |
| GB | 2 290 317 A | 12/1995 |
| GB | 2 297 803 A | 8/1996 |
| GB | 2 344 755 A | 6/2000 |
| JP | 2000-251129 A | 9/2000 |

* cited by examiner

*Primary Examiner*—Ramon O Ramirez
(74) *Attorney, Agent, or Firm*—Gottlieb, Rackman & Reisman

(57) ABSTRACT

A plinth comprises a base (6), a support plate (2) and support legs (4) supporting the plate (2) above the base (6). The support leg (4) includes a collar (20) which is attachable to the base (6), an extension member (22) which is received at one end in the collar (20), and a adjustment member (24) on the other end of the support leg (22), and attachable to the plate by a threaded adjuster (32, 40, 42). The adjustment member may be attached directly to the base (6), and in different orientations, so that adjuster (32) is received in different apertures (32, 32', 32"), providing a range of adjustment at low heights.

8 Claims, 5 Drawing Sheets

PLINTH FOR AUTOMATED TELLER MACHINE

The present invention relates to a plinth for an automated teller machine (ATM), but may also be used for supporting other devices. ATMs are manufactured to a variety of dimensions, and installed in many different locations. There is a need for a plinth which can securely support the ATM and be sufficiently adaptable to adjust to fit different ATM designs and different locations.

One aspect of the present invention provides a plinth having a base, a support plate on which a device is to be supported, and a support leg supporting the plate above the base, the support leg being adjustable to provide for different heights of the support plate relative to the base. The support leg may comprise a collar which is attachable to the base, an extension member which is received at one end in the collar, and an adjustment member on the other end of the extension member, and attachable to the plate. The extension member can be cut to length.

An adjuster may be provided between the plate and the adjustment member for finely adjusting the height of the plate.

Very preferably, the adjustment member can be attached directly to the frame, the collar and the extension member being omitted. The adjustment member may be attached to the frame in one of a plurality of orientations, each giving a different height of support to the plate member. The adjuster may be attached to the adjustment member body at different positions, to suit the orientation of the adjustment member.

Thus, a kit may be provided to enable installation of an ATM or the like at a variety of heights in a variety of locations.

At least three, preferably four support legs may be provided, and the legs are preferably not handed, so that they can be used at different locations on the base.

The invention also provides an adjustment member having a body and a height adjustment mechanism mounted thereon, wherein the mechanism is attachable to the body at different locations on the body, to suit the orientation of the adjustment member.

The support leg may comprise a collar that is of open channel section and is attachable to the base. An extension member which may be of open channel section is received at one end in the collar. The adjustment member on the other end of the extension member may comprise a box section tube lower portion which is a snug fit mounting over an end of the extension member and an open channel upper portion with a capping plate integrally formed on its upper end to receive an adjuster for finely adjusting the height of the plate.

The invention will be further described by way of example with reference to the accompanying drawings, in which.

Figure 1:
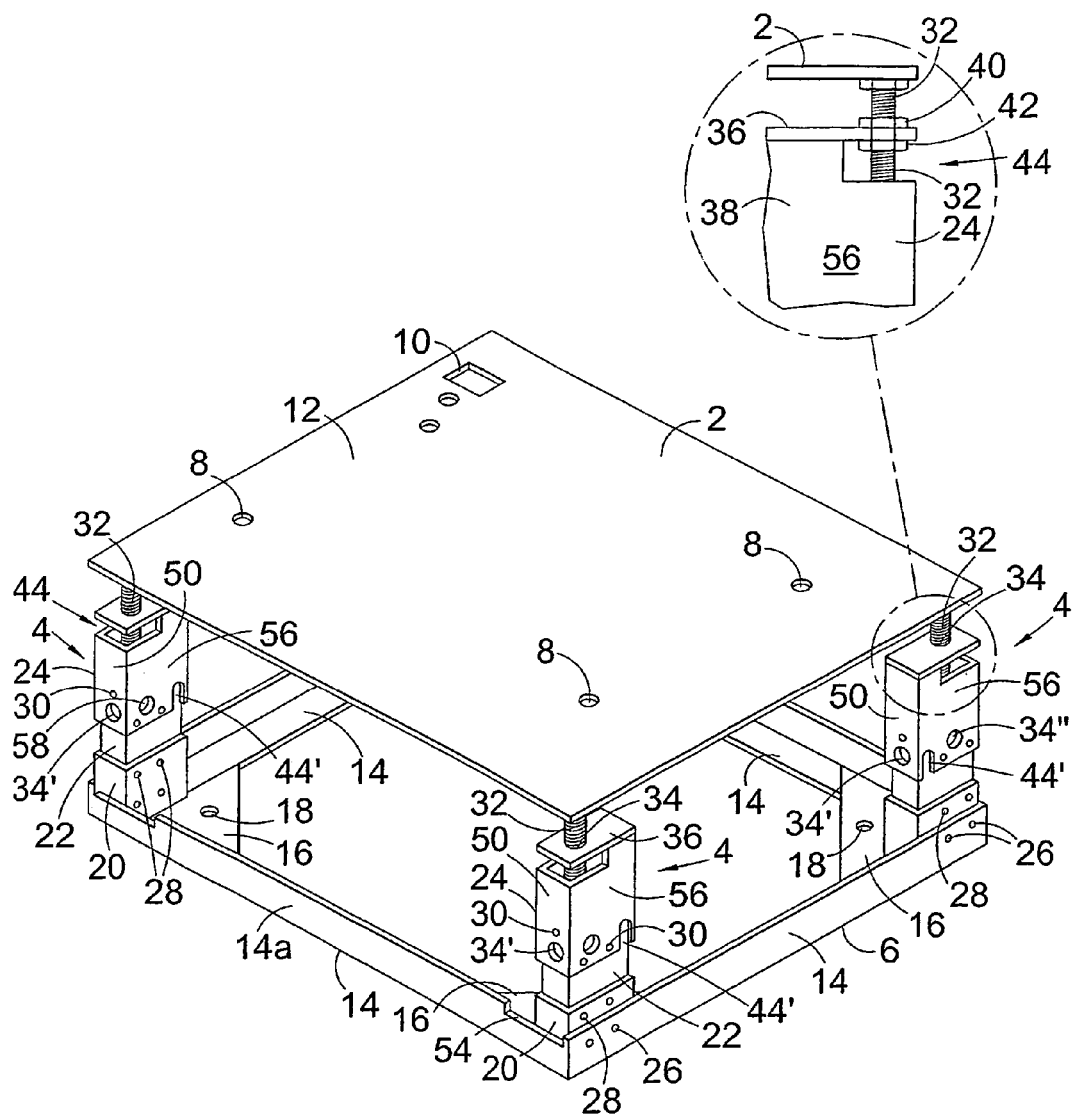
FIG. 1 is an isometric view of a plinth forming an embodiment of the invention.

Referring to FIG. 1, a support plate 2 is supported on four support legs 4 above a base 6. Support plate 2 has various apertures 8, 10 for attaching an ATM (not shown) to the upper surface 12 of the plate, and receiving wiring, etc. as well known in the art.

Base 6 has four sides formed of right angled steel extru welded in place and have apertures 18 for receiving floor bolts (not shown) for securing the base to the floor.

As shown in FIG. 1, each leg 4 comprises a collar 20, extension member 22 and adjustment member 24.

Collars 20 are box section tubes secured at the corners of base 6 by screws 26. Extension members 22 are box section extrusions which are a snug fit in the collars 20. The extension members may be cut to length and they are secured in the collars by screws 28.

At the upper end of each extension member 22 is a box section adjuster 24 which forms a particular feature of this invention. Adjuster 24 is a snug fit around the upper end of extension member 24 and secured to it by screws 30.

As shown in the enlarged detail view in FIG. 1, an adjuster in the form of an adjustment bolt or threaded rod 32 is welded to the underside of the plate 2 at each corner. Each rod 32 extends through an aperture 34 in a capping plate 36 of the body 38 of a respective adjustment members 24. The rod 32 is a sliding fit in aperture 34 and is fixed in place by nuts 40, 42 threaded on the rod 32, either side of the plate 36, the nuts being tightened to grip the plate. In this way, the height of the plate 2, relative to the base 6, can be adjusted at each corner, by turning the nut 40, and locked in position by nut 42.

A cut out 44 in the side walls of body 38 allows access to locking nut 42.

In use, the base 6 is secured in position on a floor by bolts through apertures 18 in webs 16. The collars 20 are secured in position by screw 26 through side walls 14a of the members 14. Extension members 22 are cut to length and secured in collars 20 by screws 28. The adjustment members 24 may be loosely fitted on bolts 32 and then slid over the upper ends of extension members 22. The plates 36 of the adjustment members 24 may sit on the upper ends of the extension members 22, the upper ends of members 22 being stepped to allow access through cut out 44 to nut 42, to allow final adjustment of the height of plate 20, and tightening of nuts 40, 42.

The adjustment members may be secured to the extension members by screws 30.

When a lower height plinth is required, the collars 20 and extension members 22 can be omitted. Adjustment members 24 can then be secured to the corners of the base 6, in the position of the collars 20.

The body 38 of the adjustment member can be secured in one of three positions, giving three heights. Firstly, they can be secured with their long axis vertical, in the orientation shown in FIG. 1.

Figure 2:
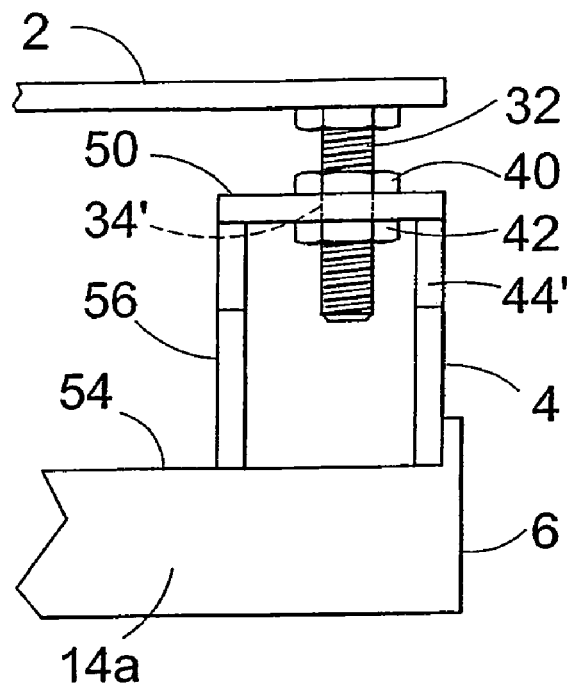
FIGS. 2 and 3 show different orientations of an adjustment member on a base of the embodiment of FIG. 1.

Secondly, as shown in FIG. 2, they can be secured with the narrower wall 50, which is about 60 mm deep, uppermost. To facilitate this, wall 50 has an aperture 34' which will receive threaded rod 32 and the upper edge 52 of sidewalls 14a are recessed at 54 to allow access to the inner nut 42.

Figure 3:
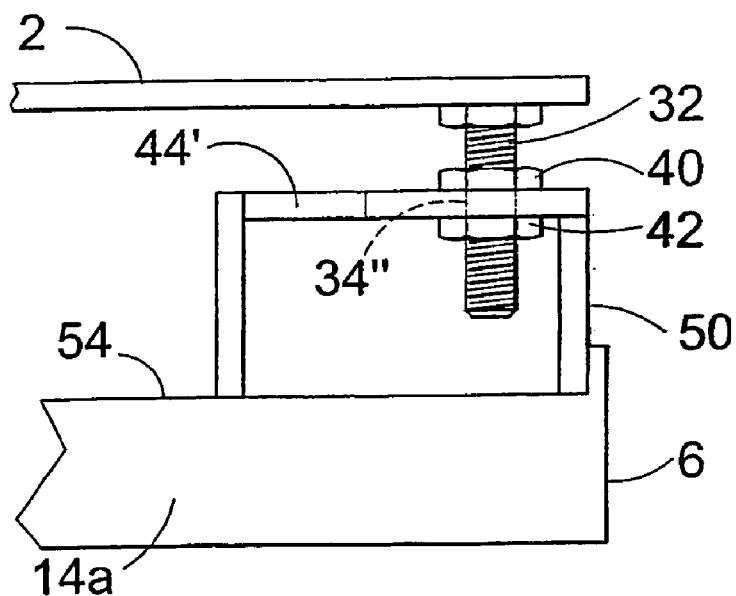

Thirdly, as shown in FIG. 3, the body 38 can be secured with the wider side 56, which is about 100 mm deep, uppermost, the threaded rod 32 extending through aperture 34".

Apertures 34, 34' and 34" are positioned so that with the adjuster body 38 in different orientations, the apertures will be in the same X-Y position relative to the base 6, so as to receive the threaded studs 32. Apertures 34' are provided in both narrower walls 50 and apertures 34" in both narrower walls 54 to allow the adjuster bodies 38 to be rotated for use at different corners of the base frame 6.

Figure 4:
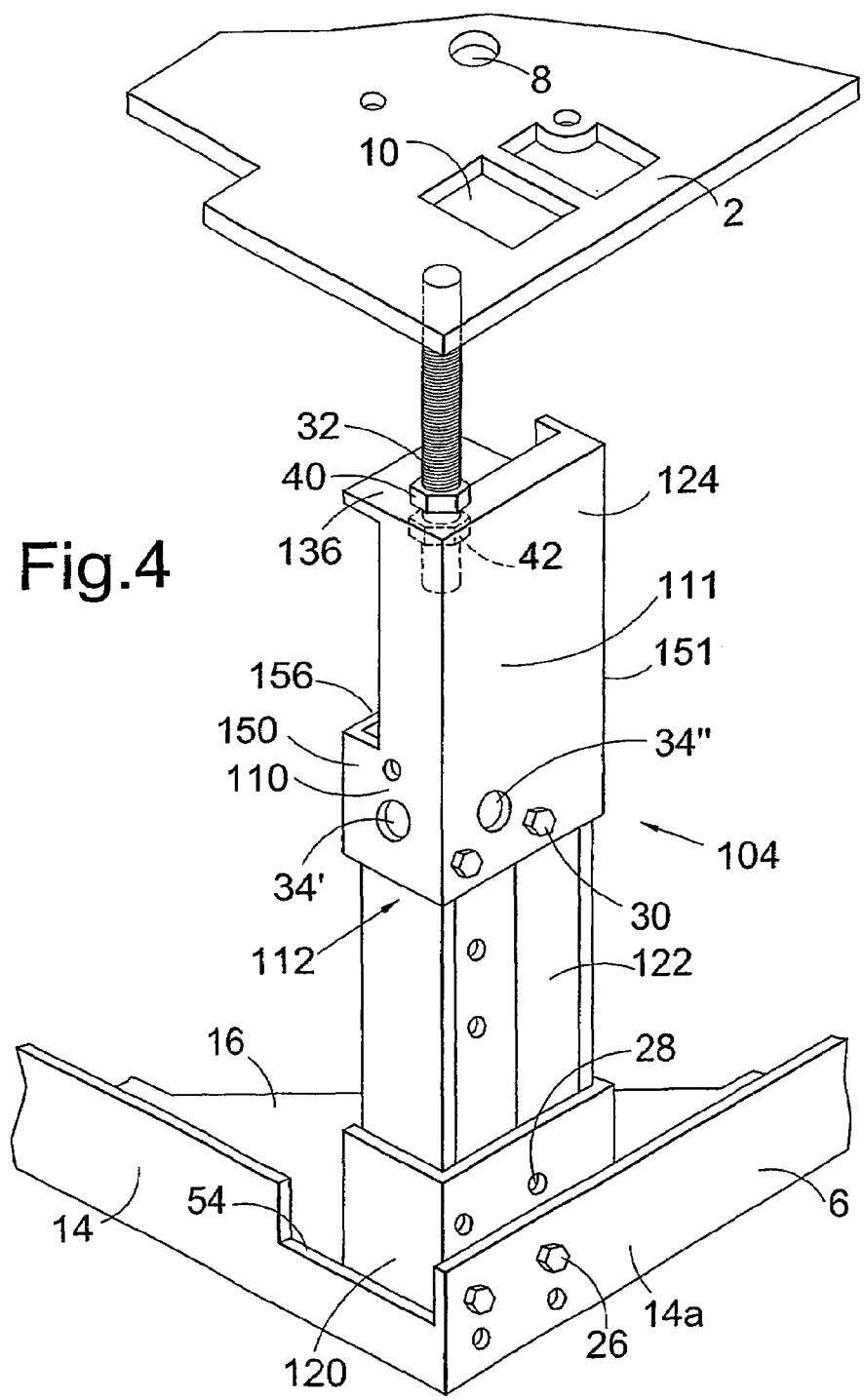
FIG. 4 shows an isomeric view of a modification of the embodiment of FIG. 1, forming a second embodiment of the invention.

Referring to the embodiment of FIGS. 4 to 7, this is similar in construction to the embodiment of FIGS. 1 to 3. As shown in FIG. 4, each leg 104 comprises a channel section collar 120, extension member 122 and adjustment member 124.

Collars 120 are of channel cross-section, i.e. having three walls in a U-shape, and are secured at the corners of base 6 by screws 26. Extension members 122 are channel sections which are a snug fit in the collars 120. The extension members may be cut to length and they may be secured in the collars 120 by screws 28.

Figure 6:
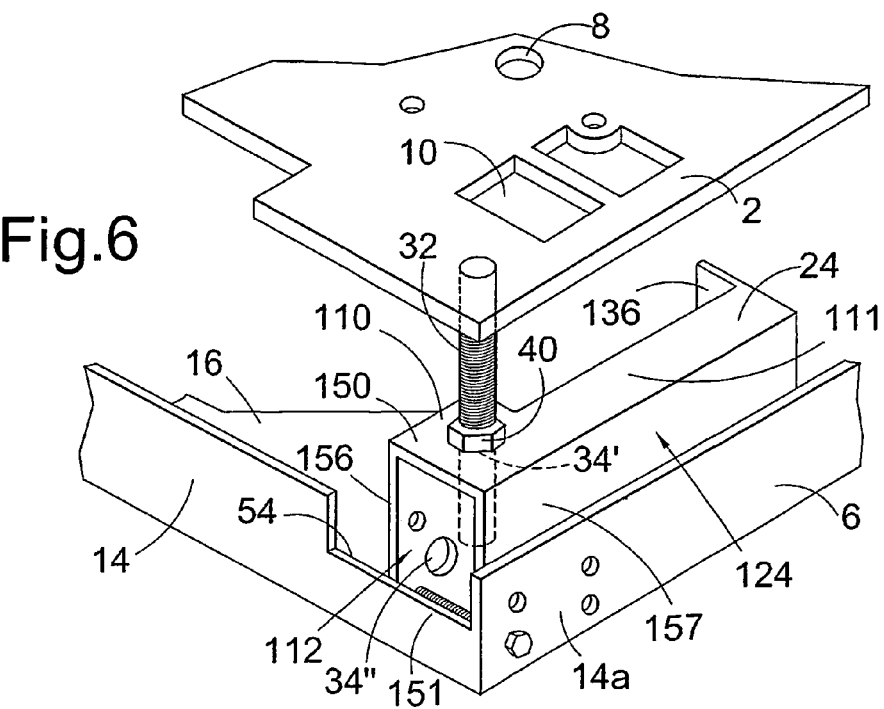
FIG. 6 shows a view of the adjustment member on the base in the embodiment of FIG. 4, in a second orientation.
Figure 8:
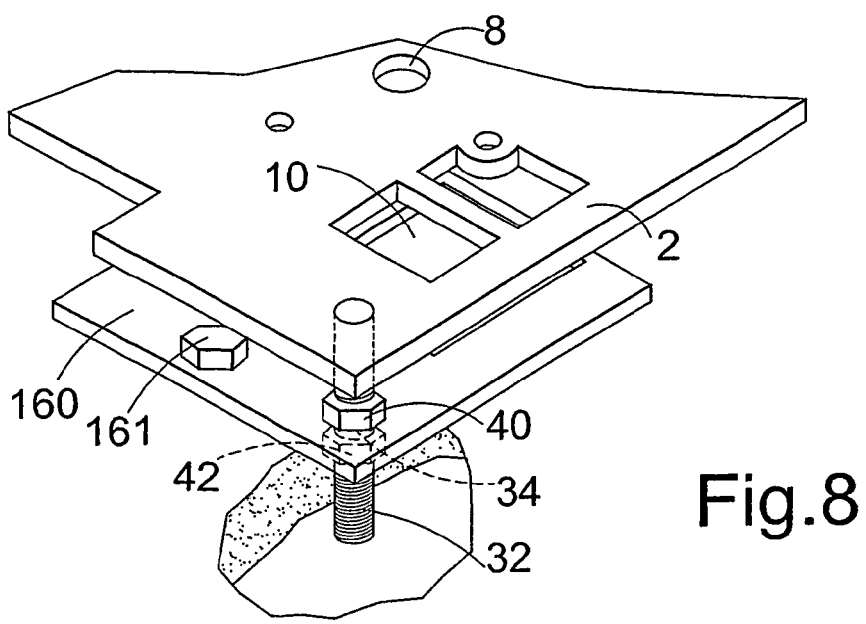
FIG. 8 shows another mounting arrangement for attaching the plate of the embodiment of FIG. 1 or FIG. 4 to the floor or other supporting surface.

At the upper end of each extension member 122 is a an adjustment member 124 which forms a particular feature of the invention. Adjustment member 124 comprises two portions, a lower portion 110 and an upper portion 111. The lower portion 110 comprises a generally box section tube with an open bottom end 112 that is snug fit over the top end of the extension member 122. The upper portion 111 of the adjustment member 124 is C-shaped, where one of the wider walls 156 and partially the two narrow walls 150 and 151 have been removed when compared to the first embodiment of the invention, as seen in FIGS. 6 and 8. The upper portion 111 also comprises a capping plate 136 which extends partially across the top of the adjustment portion 124.

Figure 5:
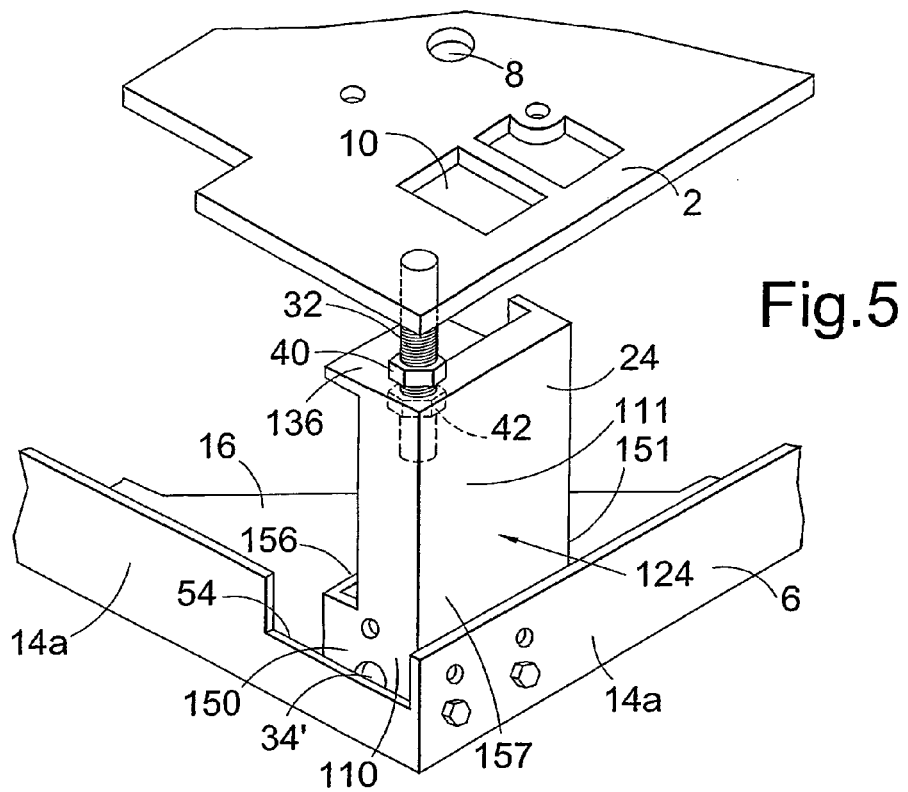
FIG. 5 shows a view of one orientation of an adjustment member of the embodiment of FIG. 4, attached directly to the base.

As in the embodiment of FIGS. 1 to 3, an adjustment bolt or threaded rod 32 is welded on the underside of the plate 2 at each corner, as shown in FIG. 5. Each threaded rod 32 extends through an aperture 34 in the capping plate 136. The threaded rod 32 is a sliding fit in aperture 34 and is fixed in place by nuts 40, 42 threaded on rod 32, either side of the capping plate 136, the nuts being tightened to grip the plate.

In use, the base 6 is secured in position on a floor by bolts through apertures 18 in webs 16 (as shown in FIG. 1). The collars 120 are secured in position by screws 26 through side walls 14a of the members 14. Extension members 122 are cut to length and secured in the C-shaped collars by screws 28. The adjustment members 124 may be loosely fitted on threaded rods 32 and then slid over the upper ends of extension members 122. When an adjustment member 124 is fully mounted on an extension member 122, the capping plates 136 of the adjustment members 124 sit on the upper ends of the extension members 122.

The adjustment members 124 may be secured to the extension members 122 by screws 30.

When a lower height plinth is required, the collars 120 and the extension members 122 can be omitted. Adjustment members 124 can then be secured to the corners of the base 6.

Figure 7:
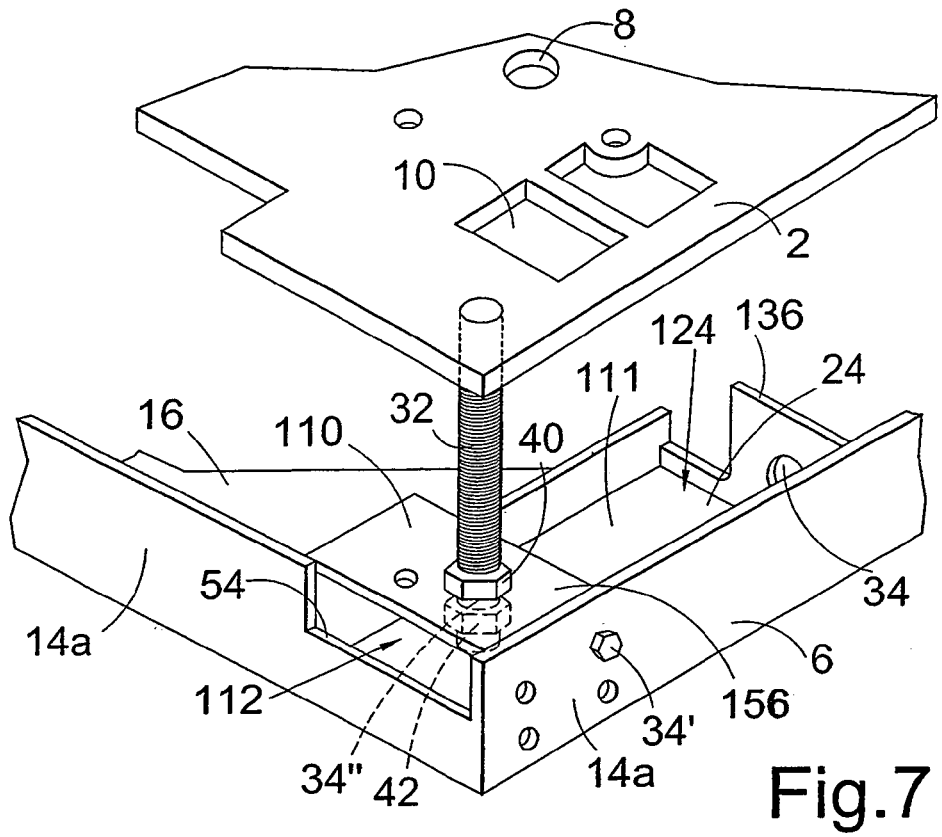
FIG. 7 shows a view of the adjustment member on the base in the embodiment of FIG. 4, in a third orientation.

The lower portion 110 of the adjustment member 124 can be secured in the corner of the base plate 6 in one of three positions, as shown in FIGS. 5, 6 and 7, giving three different heights, similar to the embodiment of FIGS. 1 to 3.

Referring to FIG. 5, the adjustment member 124 can be secured with its longitudinal axis vertical. In this case the threaded rod 32 is received in the aperture 34 in the capping plate 36 of the adjustment member 124.

Referring to FIG. 6, the adjustment member 124 can be secured with one of it's two narrower walls 150, 151, which are about 60 mm deep, of the lower portion 110 of the adjustment member 124, uppermost. An aperture 34' for the threaded rod 32 is provided in both narrower walls 150, 151, thus allowing the adjustment member 124 to be rotated for use at different corners of the base 6.

Referring to FIG. 7, the adjustment member 124 can be secured with one of the two wider walls 156, 157, which are about 100 mm deep, of the lower portion 110 of the adjustment member 124 uppermost. An aperture 34" is provided in both narrower walls 156, 157 to receive the threaded rod 32, thus allowing the adjustment member 124 to be rotated for use at different corners.

Apertures 34,34', 34" are positioned so that with the adjustment member 124 in different orientations, the apertures will be in the same X-Y position relative to the base 6 so as to receive the threaded rods 32

Each collar, extension member and adjustment member is preferably usable at any corner of the base and thus it is possible to provide a versatile support system for a plinth for an A.T.M. using a kit having a small number of different parts.

Referring to FIG. 8, when a very low height plinth is required, the frame 6, the collars 120, extension members 122 and the adjustment members 124 can be omitted. The base 6 is supported by the threaded rods 32 alone. A support plate 160 is attached to the ground surface by a bolt 161. Threaded rod 32 is secured to the plate 160 in the same manner as it was secured to the capping plate 36 in the first aspect of this embodiment as it is received in the hole 162 and held in place by nuts 40, 41. A space 163 is formed in the ground beneath the hole 162 to receive the threaded rod 32 beneath the plate 160 and allow for the threaded rod 32 to be moved up and down to vary the height of the plate 2.

Various modifications will be apparent to those in the art

The invention claimed is:

1. A plinth comprising a base, a support plate and at least three support legs supporting the plate above the base, in which each support leg includes a collar which is attachable to the base, an extension member which is received at one end in the collar, and an adjustment member on the other end of each support leg, and attachable directly to the plate.

2. A plinth as claimed in claim 1, in which the adjustment member may be attached to the base in one of a plurality of orientations, each giving a different height of support to the support plate.

3. A plinth as claimed in claim 2, wherein the adjustment member cooperates with an adjuster for fine adjustment of the height of the plate, wherein means is provided for attaching the adjuster to the adjustment member body at different positions, to suit the orientation of the adjustment member.

4. A plinth as claimed in claim 3, wherein the adjuster is attached to the support plate.

5. A plinth as claimed in claim 4, wherein the adjuster comprises a threaded rod which is received in an aperture in a wall of the adjustment member body, and apertures for receiving the threaded rod are provided in a plurality of walls of the body.

6. In combination, an automated teller machine and a plinth as defined in claim 1.

7. A height adjuster for a plinth, comprising an adjuster attached to the plinth and a body for supporting the plinth, wherein means is provided for attaching the adjuster to the body at different positions, to suit the orientation of the body, and wherein the adjuster comprises a threaded rod which is received in an aperture in a wall of the body, and apertures for receiving the threaded rod are provided in a plurality of walls of the body.

8. In combination, an automated teller machine and a plinth having a base, a support on which a device is to be supported and at least three support legs supporting the plate above the base, wherein each support leg is adapted to be mounted on the base in different orientations to provide for different heights of the support plate relative to the base.

* * * * *